United States Patent [19]

Nagaoka et al.

[11] Patent Number: 5,380,171

[45] Date of Patent: Jan. 10, 1995

[54] TURBO VACUUM PUMP

[75] Inventors: Takashi Nagaoka, Tsukuba; Shinjiro Ueda, Abiko; Seiji Sakagami; Akira Nishiuchi, both of Ibaraki; Hirofumi Sakurai, Hitachi, all of Japan

[73] Assignee: Hitachi, Ltd., Tokyo, Japan

[21] Appl. No.: 103,806

[22] Filed: Aug. 10, 1993

[30] Foreign Application Priority Data

Aug. 19, 1992 [JP] Japan .................. 4-219992

[51] Int. Cl.6 .................................. F01D 1/36
[52] U.S. Cl. ..................... 417/423.4; 417/423.11; 415/90
[58] Field of Search ............. 417/423.4, 423.9, 423.11; 415/90, 104, 109

[56] References Cited

U.S. PATENT DOCUMENTS

| | | | |
|---|---|---|---|
| 4,057,369 | 11/1977 | Isenberg et al. | 417/423.4 X |
| 4,270,882 | 6/1981 | Luyten | 415/90 X |
| 4,512,725 | 4/1985 | Saulgeot | 415/90 X |
| 4,695,223 | 9/1987 | Caspar et al. | 415/109 X |
| 4,717,315 | 1/1988 | Miki et al. | 417/423.4 X |
| 4,734,018 | 3/1988 | Taniyama et al. | 417/423.11 X |
| 5,059,092 | 10/1991 | Kabelitz | 417/423.4 X |

FOREIGN PATENT DOCUMENTS 3-7039 1/1991 Japan .

Primary Examiner—Richard E. Gluck
Attorney, Agent, or Firm—Antonelli, Terry, Stout & Kraus

[57] ABSTRACT

A turbo vacuum pump has a housing provided with a suction port and a discharge port, an evacuation pump disposed in the housing for compressing a gas sucked through the suction port and discharging the compressed gas through the discharge port, and a motor for driving the evacuation pump, the motor and the evacuation pump having a common rotor. The rotor is supported at its both axial ends by bearings. A spiral grooved dynamic seal is disposed in the vicinity of the suction port and at the opposite side of the suction port to the evacuation pump. The diameter of the spiral grooved dynamic seal, at the smallest, is greater than the outside diameter of the final stage impeller of the evacuation pump.

10 Claims, 2 Drawing Sheets

TURBO VACUUM PUMP

FIELD OF THE INVENTION

The present invention relates to a turbo vacuum pump and, more particularly, to a turbo vacuum pump of the type which has a housing provided with a suction port and a discharge port and an evacuation pump disposed in the housing, the evacuation pump being operable to compress a gas suctioned through the suction port and to discharge the compressed gas through the discharge port.

BACKGROUND OF THE INVENTION

In, for example, Japanese Patent Publication No. 3-7039 for example, a housing is provided with a suction port and a discharge port, with a rotor being vertically disposed in the housing and rotatably supported by a pair of ball bearings, with a centrifugal compression stage and a circumferential flow pump stage (or a peripheral flow pump stage) being successively disposed in a portion of the housing between the suction port and the discharge port.

The centrifugal compression stage has a centrifugal impeller carried by the rotor and a centrifugal stator which stationarily surrounds the impeller. The circumferential flow pump stage has a circumferential flow impeller (or peripheral flow pump stage) secured to the rotor and a circumferential stator (or a peripheral flow stator) which stationarily surrounds the impeller.

These pump stages overhang so as to project axially outwardly beyond the ball bearings supporting the rotor. In other words, the end of the rotor adjacent to the suction port is not supported. These pump stages are driven by a motor coupled to the rotor.

This proposed pump offers an advantage in that it can be manufactured at a low cost due to simplicity of the construction but, suffers from disadvantages in that no means are provided for canceling a large thrust force generated due to the hydrodynamic force of the discharged gas and in that high operation speed of the pump is difficult to realize due to too large length of the overhang or unsupported portion of the rotary portion.

SUMMARY OF THE INVENTION

Accordingly, an object of the present invention is to provide a turbo vacuum pump which is simple in construction, inexpensive and capable of operating at high speed.

Another object of the present invention is to provide a turbo vacuum pump which is improved to reduce the thrust force generated by the hydrodynamic of the discharged gas.

Still another object of the present invention is to provide a turbo vacuum pump which can operate without any trouble even when the gas is corrosive.

According to the present invention a turbo vacuum pump is provided which includes a housing provided with a suction port and a discharge port an evacuation pump having a rotor and disposed in the housing at a position between the suction port and the discharge port for compressing a gas suctioned through the suction port and for discharging the compressed gas through the discharge port. A motor, having a rotor common to the rotor of the evacuation pump, drives the evacuation pump, with bearing means having first and second parts which support respective opposite axial ends of the rotor. A spiral grooved dynamic seal provided in the vicinity of the suction port at the side of the suction port opposite to the evacuation pump and at a position between the suction port and the motor. The suction port, evacuation pump, discharge port, a first seal means and the motor disposed between the first and second parts of the bearing means.

Preferably, the diameter of the spiral grooved dynamic seal, at the smallest, is greater than the outside diameter of the final stage impeller of the evacuation pump.

It is also preferred that the first and the second parts of the bearing means are received in first and second bearing chambers formed in the housing, and means are provided for supplying a purge gas into these bearing chambers, with the purge gas then being discharged through discharge ports formed in the respective bearing chambers.

Operation of the motor causes a rotation of the rotor which is supported at both axial ends in the housing by the bearing means, so that the evacuation pump, disposed between the suction port, and the discharge port operates to draw a gas from an object to be evacuated. At the same time, the spiral grooved dynamic seal is also put into effect as a result of rotation of the rotor, so as to induce and discharge part of the gas suctioned through the suction port. The described construction permits the rotor to rotate at high speed because the rotor is supported at its both axial ends. In addition, since the diameter of the spiral grooved dynamic seal, at the smallest, is greater than the outside diameter of the final stage impeller of the evacuation pump, a hydrodynamic thrust force generated in the evacuation pump during the operation is canceled to some extent, thus making it possible to reduce the size or capacity of the thrust bearing or, when a ball or roller bearings are used, to extend the life of such bearings.

When the gas to be handled is corrosive, the purge gas is supplied into the bearing chambers accommodating the bearing means. The purge gas flows through the bearing means and along the motor so as to be discharged through the discharge port, thereby preventing the corrosive gas discharged by the evacuation pump and the seal means from coming into the bearing chambers and the motor chamber.

DESCRIPTION OF THE PREFERRED EMBODIMENTS

Figure 1:
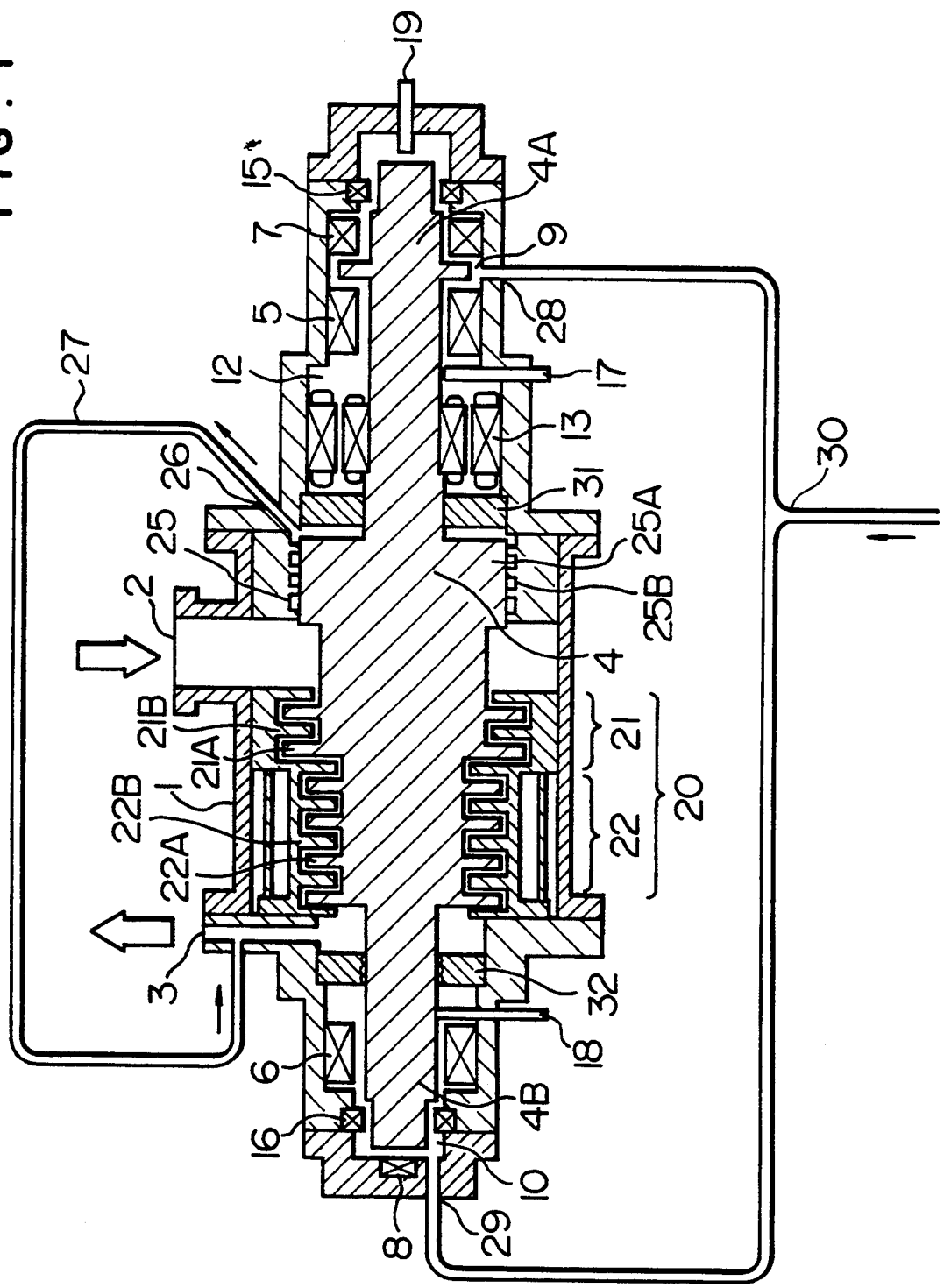
FIG. 1 is a longitudinal sectional view of an embodiment of the turbo vacuum pump in accordance with the present invention.

A housing 1 is provided with a suction port 2 and a discharge port 3. The housing 1 accommodates a rotor 4. The rotor 4 is supported at its one end portion 4A by a radial active magnetic bearing 5 and a thrust active magnetic bearing 7 and at its other end portion 4B by a combination of a radial active magnetic bearing 6 and a thrust passive magnetic bearing 8 which includes a permanent magnet. Touch-down bearings 15 and 16 are disposed on the axially outer sides of the radial active magnetic bearings 5 and 6, respectively.

The radial active magnetic bearing 5, thrust active magnetic bearing 7 and the touch-down bearing 15 are received in a first bearing chamber 9 defined in the housing 1. Similarly, the radial active magnetic bearing 6, thrust passive magnetic bearing 8 and the touchdown bearing 16 are installed in a second bearing chamber 10 which also is defined in the housing 1. The rotor 4 is driven by a motor 13 which is disposed in a motor chamber 12 formed in the housing 1. Radial position sensors 17 and 18 are disposed in the vicinity of the radial active magnetic bearings 5 and 6, while a thrust position sensor 19 is disposed in the vicinity of the thrust active magnetic bearing 7.

An evacuation pump 20 is provided in the housing 1 between the suction port 2 and the discharge port 3. The evacuation pump 20 includes a centrifugal compression stage 21 and a circumferential pump stage (or a peripheral flow pump stage) 22 which is disposed downstream of the centrifugal compression stage as viewed in the direction of flow of the gas. The centrifugal compression stage 21 has a plurality of centrifugal impellers 21A mounted on the rotor 4 and a centrifugal stator 21B stationarily held by the housing 1, surrounds the centrifugal impellers 21A. The circumferential pump stage 22 has a plurality of circumferential flow impellers 22A mounted on the rotor 4 and a circumferential flow stator 22B stationarily held stationary so as to surround the circumferential flow impellers 22A.

A first seal means 25 is provided at the opposite side of the suction port 2 to the discharge port 3. The first seal means includes a radially expanded portion 25A of the rotor 4 and a screw-thread seal 25B which is provided on the inner surface of the housing 1 so as to oppose the radially expanded portion 25A of the rotor 4. The screw thread of the seal 25B is formed in such a direction that, when the rotor rotates, part of the gas suctioned through the suction port 2 is induced and conveyed towards the motor chamber 12 by the screw thread.

The diameter of the screw thread seal 25B, at the smallest, is greater than the outside diameter of the final or downstream end impeller of the evacuation pump 20. With this arrangement, it is possible to cancel, to some extent, the thrust force which is generated by the hydrodynamic force of the gas in the evacuation pump 20. The screw thread forming the screw thread seal 25B may be provided on the outer peripheral surface of the rotor 4, although it is provided on the inner peripheral surface of the housing 1 in the illustrated embodiment.

The suction port 2, evacuation pump 20, first seal means 25 and the motor 13 are all within the axial range between the pair of radial active magnetic bearings 5 and 6.

The motor chamber 12 accommodating the motor 13 for driving the rotor 4 has a second discharge port 26 which communicates with the discharge port 2 through a pressure balance pipe 27. A first purge gas supply port 28 and a second purge gas supply port 29 open in the first bearing chamber 9 and the second bearing chamber 10, respectively. An inert gas such as nitrogen gas, serving as a purge gas, is supplied through an external supply pipe 30 and is fed through these purge gas supply ports 28 and 29. The pressure of the gas thus supplied is determined such that the gas discharged from the evacuation pump 20 and the first seal means 25 does not flow into the bearing chambers and the motor chamber.

A second seal means 31 including a labyrinth seal is provided between the motor chamber 12 and the second discharge port 26, so as to seal the motor chamber 12 from the pump stages in the housing 1. A third seal means 32, which also includes a labyrinth seal, is provided between the second bearing chamber 10 and the discharge port 3, so as to provide a seal between the second bearing chamber 10 and the pump stages in the housing 1.

In operation, the motor 13 is started and drives the rotor 4 thereby starting the evacuation pump 20, so that a gas is suctioned through the suction port 2 and is progressively compressed through the centrifugal compression stage 21 and the circumferential flow pump stage 22 of the evacuation pump 20. The gas is then discharged into the atmosphere through the discharge port 3. The first seal means 25 of the screw thread type functions as an evacuation pump of a small capacity so as to compress part of the gas suctioned through the suction port 2 and to deliver the compressed gas through the second discharge port 26 and the pressure balance pipe 27. The gas thus delivered merges in the compressed gas in the discharge port 3 so as to be discharged therefrom.

In the event that the gas suctioned through the suction port 2 is corrosive, the gas may cause corrosion and other problems of the motor 13 and the bearings if the gas is allowed to enter the motor chamber 12 and the first bearing chamber 9 and second bearing chamber 10. In order to prevent such a corrosive gas from entering the first bearing chamber 9 and the second bearing chamber 10, an inert gas such as nitrogen gas is introduced as a purge gas externally through the supply pipe 30 and via the first purge gas supply port 28 and the second purge gas supply port 29, respectively.

The purge gas introduced into the first bearing chamber 9 merges in the gas which has been delivered through the first seal means 25 so as to be introduced into the discharge port 3 through the second discharge port 26 and the pressure balance pipe 27, while the purge gas flowing into the second bearing chamber 10 is discharged through the discharge port 3 together with the gas which has been compressed through the evacuation pump 20. The second seal means 31 and third seal means 32 are provided for the purpose of reducing the rates of supply of the purge gas. Although labyrinth seals are used as these sealing means 31 and 32 in the illustrated embodiment, the use of the labyrinth type seal is only illustrative and other types of seals such as floating ring seals which provide minute gap may be used as the first and second seal means 31, 32.

Introduction of gas in the motor chamber 12 and the first and second bearing chambers 9 and 10 does not cause problems such as corrosion of the motor 13 and the bearings, provided that the gas is not corrosive. In such a case, therefore, it is not necessary to supply the purge gas into the first and second bearing chambers 9 and 10 and the first purge gas supply port 28 and second purge gas supply port 29 may be omitted. The second and third seal means 31 and 32 also may be omitted.

The rotating rotor 4 is horizontally supported by the radial active magnetic bearings 5 and 6 in the illustrated embodiment, and is axially located by the thrust active magnetic bearing 7 and the thrust passive magnetic bearing 8 having a permanent magnet, against the fluid dynamical thrust force. The radial active magnetic bearings 5, 6 and the thrust active magnetic bearing 7 are controlled, respectively, in accordance with control signals which are produced by a controller (not shown) in accordance with position signals derived from the radical position sensors 17, 18 and the thrust position sensor 19.

The radial active magnetic bearings 5, 6 and the thrust magnetic bearing 7 are disabled to support the rotor 4 when supply of electrical power is terminated due to, for example, a power failure. In such a case, the rotor 4 is safely supported by the touch-down bearings 15, 16. The radial active magnetic bearings 5, 6 and the thrust active magnetic bearing 7 may be substituted by radial gas bearings and a thrust gas bearing, respectively.

In the turbo vacuum pump of the present invention as described above, the rotor 4 can rotate at a high speed by virtue of the fact that it is stably held at its both axial end portions by the bearing means. In addition, replacement of the touch-down bearings 15, 16 can be conducted without difficulty because the bearings are disposed on axial outer end extremities of the rotor 4. Furthermore, the size or capacity of the thrust bearing can be reduced by virtue of the fact that the fluid dynamic thrust force generated in the evacuation pump 20 can be reduced by the provision of the screw-thread type first seal means 25.

Figure 2:
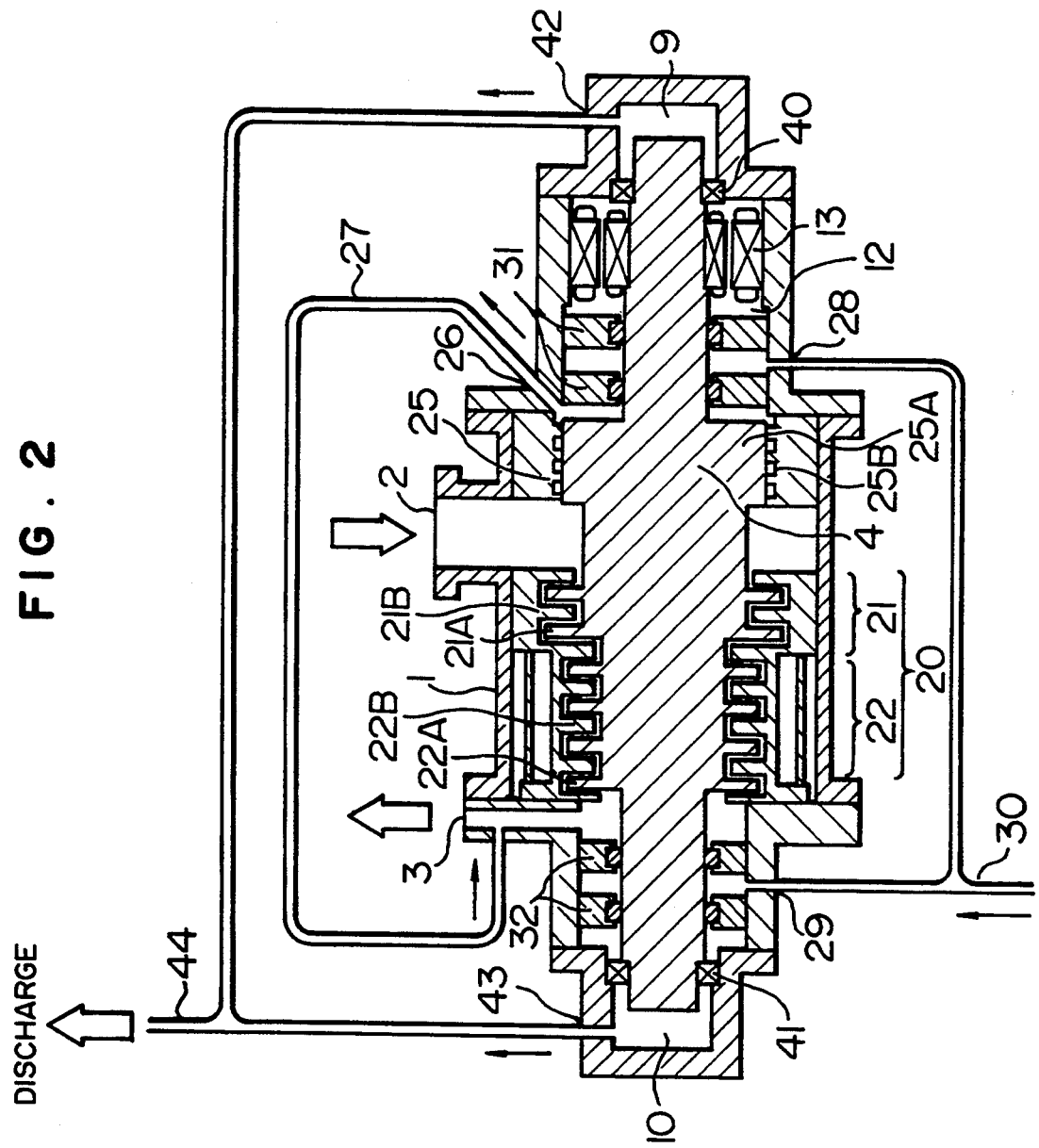
FIG. 2 is a longitudinal sectional view of another embodiment of the turbo vacuum pump in accordance with the present invention.

As shown in FIG. 2, the rotor 4 has both end shaft portions 4A, 4B supported by ball or roller bearings 40, 41. These bearings 40, 41 require lubrication by oil. It is therefore necessary to take a suitable measure for preventing the lubricating oil from entering the evacuation pump 20. To this end, according to the invention, each of the second seal means 31 and the third seal means 32 is split into two parts, and the first and second purge gas supply ports 28 and 29 are disposed to open between the two parts of the respective seal means 31 and 32.

The purge gas supplied through the first purge gas supply port 28 shunts into the two parts of the second seal portion 31. Part of the gas is introduced through the second discharge port 26 into the discharge port 3 so as to be discharged therefrom. The remainder part of the gas is introduced into the first bearing chamber 9 through the motor chamber 12 and is discharged through a third discharge port 42 opening in the first bearing chamber 9 and further through a discharge pipe 44. Meanwhile, the purge gas supplied through the second purge gas supply port 29 shunts into the two parts of the split third seal means 32. Part of the gas reaches the discharge port 3 so as to be discharged therefrom. The remainder of the gas is introduced into the second bearing chamber 10 so as to be discharged through a fourth discharge port 43 opening in this chamber 10 and further through the above-mentioned discharge pipe 44.

The described sealing structure plays a double role of preventing the lubricating oil from coming into the evacuation pump 20 and preventing the gas suctioned through the suction port 2 from flowing into the motor chamber 12 and the first and second bearing chambers 9 and 10. In addition, the ball or roller bearings 40, 41 can have extended life because the fluid dynamic thrust force generated in the evacuation pump 20 is reduced. Furthermore, the rotor which is supported at its both ends can safely rotate at high speed, and the ball or roller bearings 40, 41 on both end extremities of the rotor can easily be renewed, as in the case of the first embodiment described in connection with FIG. 1.

In the above-described embodiments, the evacuation pump 20, includes centrifugal and circumferential flow stages. The evacuation pump in the turbo vacuum pump of the present invention, however, may includes other types of turbo pump elements or stages such as an axial flow stage, screw thread stage and so forth.

In addition, the turbo vacuum pump has a simple construction since only one set of evacuation pump is employed. Consequently, the cost of production is low. Furthermore, the turbo vacuum pump of the invention has a screw thread seal which is disposed at the opposite side of the suction port to the evacuation pump, and the diameter of the screw thread seal, at the smallest, is greater than the outside diameter of the impeller of the final stage, so that the fluid dynamic thrust force generated in the evacuation pump is reduced. This makes it possible to reduce the size or capacity of the thrust bearing. For the same reason, service life of ball or roller bearings, which also receive thrust force, can be prolonged.

What is claimed is:

1. A turbo vacuum pump comprising:
   a housing provided with a suction port and a discharge port;
   an evacuation pump housed in said housing and carried by a rotor for compressing a gas suctioned through said suction port and for discharging the compressed gas through said discharge port;
   a motor including a rotor carried by said rotor of said evacuation pump for driving said evacuation pump;
   bearing means for supporting opposite axial end portions of said rotor of said evacuation pump in said housing; and
   spiral grooved dynamic seal means provided in a vicinity of said suction port at an opposite side of said suction port to said evacuation pump.

2. A turbo vacuum pump according to claim 1, wherein said bearing means includes a first part supporting one axial end of said rotor and a second part supporting the opposite axial end of said rotor of said evacuation pump, said first part of said bearing means including a radial active magnetic bearing and a thrust active magnetic bearing, said second part of said bearing means including a radial active magnetic bearing and a thrust passive magnetic bearing.

3. A turbo vacuum pump according to claim 1, wherein said seal means is positioned between said suction port and said motor, said bearing means includes a first part for supporting one axial end portion of said rotor of said evacuation pump and a second part for supporting the opposite axial end portion of said rotor of said evacuation pump, said first and second parts of said bearing means being received in said first and second bearing chambers formed in said housing, said motor being disposed in a motor chamber, said first and second bearing chambers being provided with purge gas supply portions opening therein, said turbo vacuum pump further comprising a second seal means provided between said dynamic seal means and said motor chamber, a second discharge port provided between said dynamic seal means and a pressure balance pipe providing communication between said second discharge port and said first mentioned discharge port.

4. A turbo vacuum pump according to claim 5, wherein said first part of said bearing means includes a radial active magnetic bearing and a thrust active magnetic bearing, and said second part of said bearing means includes a radial active magnetic bearing and a thrust passive magnetic bearing.

5. A turbo vacuum pump according to claim 1, wherein said evacuation pump is disposed between said suction port and said discharge port, said seal means is positioned between said suction port and said motor, and wherein said bearing means includes a first part supporting one axial end of said rotor of said evacuation pump and a second part for supporting the opposite axial end of said rotor of said evacuation pump, said suction port, said evacuation pump, said discharge port, said seal means and said rotor being positioned between said first and second parts of said bearing means.

6. A turbo vacuum pump according to claim 5, wherein said first part of said bearing means includes a radial active magnetic bearing and a thrust active magnetic bearing, and said second part of said bearing means includes a radial active magnetic bearing and a thrust passive magnetic bearing.

7. A turbo vacuum pump comprising:
   a housing provided with a suction port and a discharge port;
   an evacuation pump housed in said housing and carried by a rotor, and a plurality of stages of impellers for compressing a gas suctioned through said suction port and for discharging the compressed gas through said discharge port; and
   spiral grooved dynamic seal means provided in a vicinity of said suction port at an opposite side of said suction port to said evacuation pump, said seal means having a screw thread seal with a diameter which, at the smallest, is greater than an outside diameter of a final stage of the impellers of said evacuation pump.

8. A turbo vacuum pump according to claim 7, further comprising bearings for supporting opposite axial ends of said rotor in said housing, said bearings including a first part for supporting one axial end of said rotor and a second park for supporting the opposite axial end of said rotor, said first part of said bearings including a radial active magnetic bearing and a thrust active magnetic bearing, said second part of said bearings including a radial active magnetic bearing and a thrust passive magnetic bearing.

9. A turbo vacuum pump comprising:
   a housing provided with a suction port and a first discharge port;
   an evacuation pump housed in said housing and carried by a rotor for compressing a gas suctioned through said suction port and discharging the compressed gas through said first discharge port;
   a motor including a rotor carried by said rotor of said evacuation pump for driving said evacuation pump and accommodated in a motor chamber defined in said housing and having a second discharge port;
   bearing means having a first part and a second part respectively received in a first bearing chamber and a second bearing chamber formed in opposite axial end portions of said housing, said first and second parts of said bearing means supporting the respective axial end portions of said rotor in said housing; and
   a pressure balance pipe providing communication between said second discharge port and said first discharge port.

10. A turbo vacuum pump according to claim 9, wherein said first part of said bearing means includes a radial active magnetic bearing and a thrust active magnetic bearing, and said second part of said bearing means includes a radial active magnetic bearing and a thrust passive magnetic bearing.

* * * * *